April 1, 1941.  W. F. OCENASEK  2,236,854
INERTIA ELIMINATOR
Filed April 19, 1938   2 Sheets-Sheet 1

INVENTOR
William F. Ocenasek
BY
Albert F. Nathan
ATTORNEY

April 1, 1941.  W. F. OCENASEK  2,236,854
INERTIA ELIMINATOR
Filed April 19, 1938  2 Sheets-Sheet 2
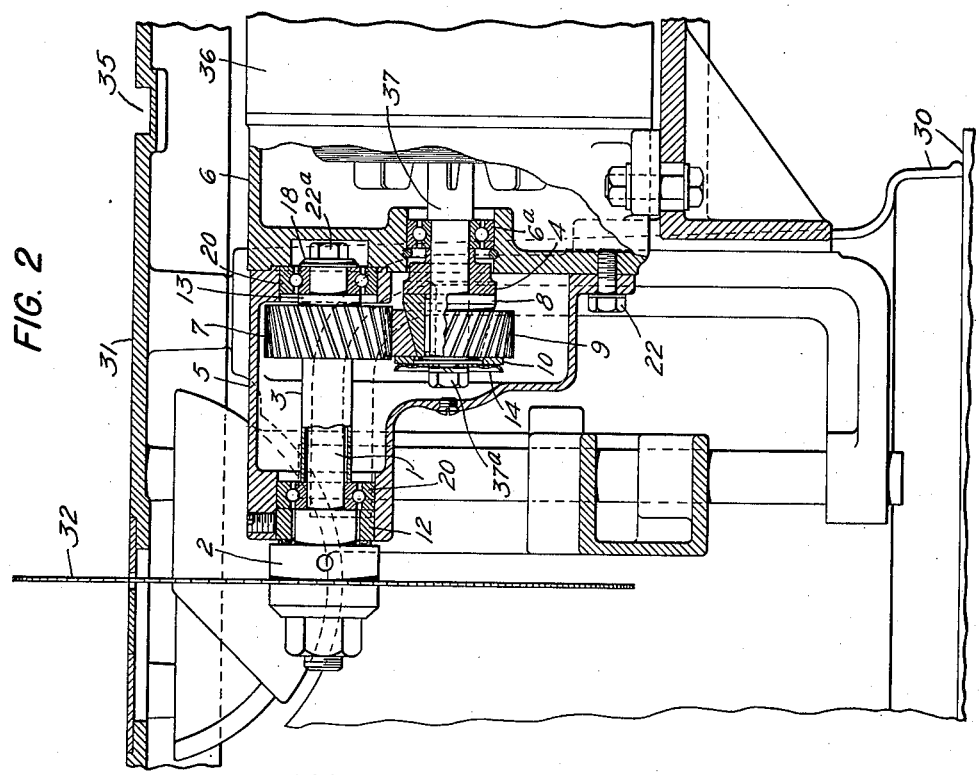
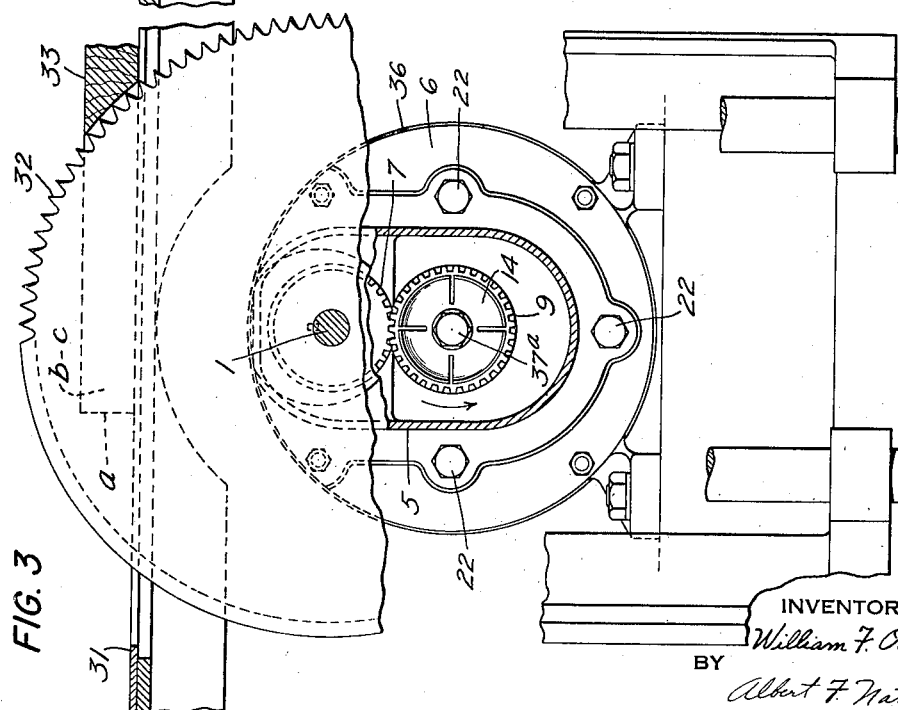
INVENTOR
William F. Ocenasek
BY
Albert F. Nathan
ATTORNEY Patented Apr. 1, 1941

2,236,854

UNITED STATES PATENT OFFICE 2,236,854

INERTIA ELIMINATOR

William Ferdinand Ocenasek, Plainfield, N. J., assignor to Walker-Turner Co. Inc., Plainfield, N. J., a corporation of New York Application April 19, 1938, Serial No. 202,850

8 Claims. (Cl. 64—30)

This invention relates to high speed power transmissions and particularly to a device for preventing the breaking of gears incident to a sudden accidental stopping of the driven part.

In motor driven geared saws the condition that the present invention undertakes to meet is well illustrated, for in the operation of such machines, all of the factors that heretofore resulted in the breaking of gears in the drive between the saw mandrel and the motor, are present.

When sawing through a relatively wide plank, for example, the operator holds the plank against the mitre gauge at one side of the line of cut and endeavors to hold and guide that portion of the plank on the other side of the line of cut, freehand. After the saw is part way through the plank, certain very definite forces are released in the plank and the opposed end portions thereof tend to close upon and stop the saw. In some instances, the closing-in on the saw may be due to the unwieldiness of the planking being cut or to the lack of coordination in the handling. Or a warped or twisted board will frequently pinch and bind on the saw and cause a sudden stopping thereof. At the instant of stopping there is built up a tremendous braking force on the transmission, and it is this intense instantaneously acting force that causes one or more of the gears in the transmission to break.

The primary aim of the present invention is to prevent the disastrous consequences of the sudden stopping of the transmissions of this character, while at the same time permit the motor to stall when the saw or other driven element is abruptly stopped. In other words, the aim is not to prevent stalling of the motor but to permit stalling without the breaking of gears or the twisting off of shafts. Overload switches, fuses, special windings, etc., protect the motor upon stalling and the present device is not for that purpose.

Stalling of the motor must follow to be sure that the driving transmission will always be effective to carry the normal peak load upon the starting and any normal load or normal overload that may be imposed during the operation. To accomplish those ends the invention aims for a device that may be incorporated in the transmission which will transmit the full horse power capacity of the motor to and slightly beyond the point of stalling but which will eliminate, by absorbing, the excessive forces of inertia generated upon a sudden stopping of the parts and thereby protect the gearing and shafting against fracture. By way of additional improvements the invention further aims to render available a durable compact mechanism consisting of few easily manufactured parts that occupy little space (hardly more than one of the gears itself) and which, therefore, may be embodied in confined restricted quarters of close coupled power transmissions.

In order to cope with conditions involving high speeds and inertia of rapidly running parts, it is proposed to mount one of the gears in the transmission train upon a cone shaped shaft, the sides of which diverge. The end face of the gear is arranged to come substantially flush with the small end of the cone and is held in driving relation on the cone by means of a heavy spring and an intervening washer. The spring is carried by the shaft and urges the gear in the direction of the large end of the cone with a force sufficient to maintain the driving relation to a point well above the rated horse power of the motor and any normal or normal overload that may be placed thereon, but below the breaking point of the gears. It has been found that with a device so constructed, the rapidly revolving saw blade may be repeatedly pinched and instantly stopped without damage to any part of the transmission although the motor is simultaneously stalled.

This safety action may be explained by the fact that when the excessive load occurs (by the sudden stopping of the saw) its magnitude is so great and the resulting tooth pressure so intense as to cause the pinion to ride outward on the cone against the spring, an infinitesimally small distance, thus absorbing the energy, and in so doing, slowing down the drive shaft. However, inasmuch as this super force acts in a manner comparable to the speed and force of lightning, it builds up and expires in an instant. So quickly does the force build up and is eliminated by this device that the gear does not change its angular position on the cone more than a few degrees before it again seats itself and completes the stalling of the motor. In that short fleeting instant the danger point has come and safely passed.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Fig. 2 is a sectional view through a typical power transmission.

Fig. 3 is an end view thereof.

Figure 1:
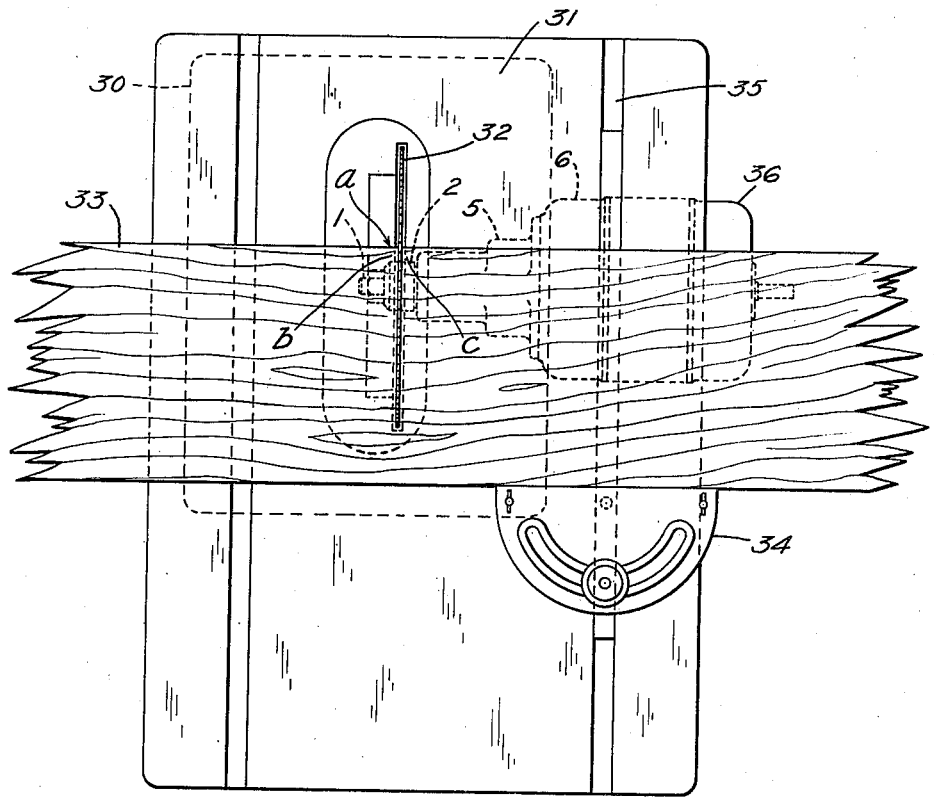
Figure 1 is a plan view of a saw table embodying the present invention.
Figure 4:
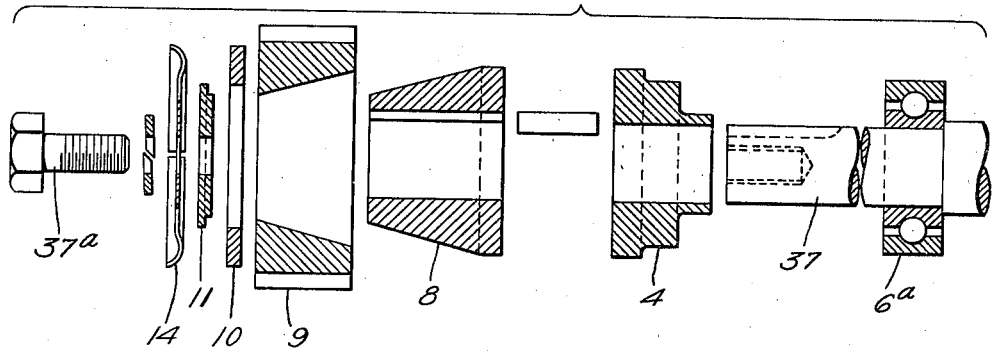
Fig. 4 is an exploded view of the parts of the inertia eliminating device.

Referring more particularly to Figure 1, the invention is disclosed embodied in a gear driven power saw having a base 30 which supports a work surface or table 31. A saw 32 projects through a slot in the table top in the usual manner. The stock or workpiece to be cut by the saw is represented by the board 33 which is ordinarily held against a mitre guide 34 translatable in one of the guideways 35 in the top of the table.

The power drive for the saw comprises a motor 36, gears 9 and 7 and the saw mandrel 1. In the present instance the saw mandrel is journaled in combined radial and thrust bearings 20, in a housing 5 which in turn is located on a motor hood 6 and bolted thereto by the screws 22. The motor hood is fitted to the end of the motor 36, the motor shaft 37 of which, extends into the housing 5 and carries at its end the gear 9. The gear 9 meshes with the gear 7 which is keyed to the saw mandrel 1 and is held against endwise shifting thereon by means of a sleeve 3 and a collar 13 interposed between the thrust bearings 20. A collar 12 is provided at the outer end of the housing for adjusting the tightness with which these parts are held together. The saw mandrel is held against endwise shifting by means of a collar 2, which engages one of the bearings 20, and a washer 18 which abuts against the outer face of the inner race of the other bearing. A screw 22ª is provided for clamping the washer 18 and for taking up excess endplay.

Under normal operating conditions the operator will hold the workpiece 33 against the mitre gauge 34 and push it toward the saw with the expectation of cutting off a porion of the workpiece. As the work is brought into engagement with the saw and the sawing operation starts, the stresses in the fibers along the leading edge a of the workpiece are released. As the sawing operation continues more stresses are released until the point is reached where the stresses in the uncut portion of the board predominate and cause a springing open or a closing of the saw kerf at the regions b—c. In the former eventuality no harm is done but in the latter eventuality the saw is pinched in the cut and abruptly stopped.

Again, if the workpiece is unwieldy or difficult to manage, the outer end portions may advance more rapidly than the portion in the line of cut. This also causes a pinching of the blade and the saw is suddenly stopped.

With a ¾ or 1 H. P. motor driving the transmission at 3500 R. P. M., the power developed may actually be several times the motor rating because of the inertia of the shafting, gears, motor armature, etc. When the saw is pinched, the pinching occurs with the extreme rapidity and without warning, and this instantaneous stopping of parts running at high speed, places a tremendous load on the gears 7 and 9, and one or the other gives way.

To overcome this difficulty this invention proposes a device that will hold the drive effective under every normal condition, every ordinary increase in work resistance, and every normal overload to which the drive may be subjected, yet one that will automatically function to absorb and eliminate, without danger, the intense forces generated by a quick stopping.

With that end in view it is proposed to key or otherwise secure a cone shaped member 8 to the end of the motor shaft 37 and to mount thereon the gear 9. The gear is held in relatively tight frictional engagement with the cone by means of the low angle of the taper and a circular spring element 14 and an intervening washer 10.

The hole in the washer is substantially larger than the small end of the cone and is held concentrically therewith by means of an inner washer 11. A screw 37ª passes through the spring 14, washer 11, and threads into the motor shaft 37, and holds the cone 8 against a collar 4, and the collar 4 against the inner race of a radial thrust bearing 6ª. The motor shaft 37 shoulders against the opposite side of the bearing 6ª, and the screw 37ª through the intervening spring 14 and washer 10, firmly holds the gear 9 tightly upon the cone with sufficient frictional engagement to transmit all of the motor torque to the gear 7 and saw mandrel. Experiments have shown that an angle of 15° for the sides of the cone, give exceptionally good results, whereas an angle of more than 16° 75′ proved inefficient for the present purposes.

The gear 9 may be made from any suitable gear material and has its center bored out at an angle complemental to that of the cone. If desired, a cone-shaped insert may be used. When the gear is placed upon a cone of an angle such as indicated, little pressure is required to establish a powerful friction drive between the two elements.

As previously mentioned, the pressure is furnished by the disc shaped spring 14 and to prevent the spring from exerting the force directly on the end face of the gear, the annulus 10 is inserted therebetween. The annulus 10 is made preferably from hardened and ground stock, which affords relatively smooth wear resisting surfaces that effectively resist the tendency of the parts to stick when the super tooth pressure load that causes the gear to ride out on the cone the infinitesimal distance, occurs. It will be understood that the inner washer 11 is substantially thinner than the annulus 10 so that sufficient relative movement therebetween in an axial direction will occur to effect at all other times a tight engagement of the gear on the cone and a powerful frictional drive therethrough.

The cone feature of the drive performs two very definite functions, the first is that it affords a large area of frictional engagement, and which, because of its shape, can be located in its entirety close to the periphery of the gear where it can exert itself to greater mechanical advantage than could be obtained by other methods, and the second function is its coacting relation with the teeth on the gear, in affording the means coacting with the spring for absorbing the tremendous forces built up when the saw or other driven element of transmission is quickly stopped.

As illustrated in the drawings, the gears 7 and 9 are of the helical gear type having a helix angle of approximately 20°. The gear 9 in the particular combination and relation of parts disclosed is a right handed helical gear, and gear 7 a left handed helical gear. In addition to the fact that the helical gears are used herein in promoting a smooth, quiet, and powerful drive, the helix angle of the gears cooperate in the eliminating of the energy instantaneously built up on the sudden stopping of the saw. It will be observed that the gear 9 runs in the direction of the arrow and its teeth are inclined such that if the gear 7 were locked, continued turning of the motor shaft would screw the gear to the left (in Fig. 2). If the axial movement was not prevented, the gear 9 would obviously screw itself completely out of engagement with the gear 7.

Under normal conditions, however, the axial thrust of the gear 9 is inconsequential, for the maximum load on the transmission will never, except under one condition, be great enough to overcome the effect of the spring 14 that maintains the gear on its seat and the drive effective. However, when the saw, mandrel, motor armature etc., running at a very high speed and are suddenly brought to a positive stop, the tremendous load that is simultaneously built upon the transmission, causes an infinitesimal axial shifting of the gear 9 on the cone against the spring.

The force required to effect the shifting must, it will be seen, act through a very low angle, in this case approximately 20°, to effect the axial shifting. And since tooth load times the tangent of the angle equals the axial thrust upon the gear, the spring 14 need be only strong enough to maintain a normal state of balance. However, for all ordinary conditions of operation of the transmission, the spring 14 is set to exert a force approximately 2½ times the rated H. P. of the motor which is more than enough to maintain the state of balance and thereby definitely insuring firm driving engagement between the gear and the cone. When so assembled, ordinary starting torque or variations in work resistance have no effect upon the drive and for all practical purposes it is as though the parts were positively keyed together. When, however, the saw is brought to a sudden stop the accumulated inertia of the motor armature tends to continue the motion and builds up an intense tooth pressure, and this force instead of dissipating itself in breaking the gear, is completely and instantly eliminated in the infinitesimal spiral shifting of the gear in opposition to the action of the spring.

In this manner, the excess energy is instantaneously safely dissipated by the mechanism and since the force has no duration the spring 14 immediately restores the gear 9 to its seat upon the cone. It will be appreciated that the transition occurs with extreme rapidity, firstly, because of the speed with which the super force acts and secondly, because the forces that effect the infinitesimal shifting must act through the conical surfaces of the drive and they are lost the instant there is any separation between those surfaces. The spring 14 thereupon predominates and forces the gear back on its seat. If the load that brought about the abrupt stopping of the saw were to be removed at the same instant, the drive would again be effective immediately. However, since the saw will still be pinched and the remaining portions of the transmission definitely locked against movement, the reseating of the gear 9 on the cone has the effect of locking the motor shaft 37 and promptly stalls the motor. In the absence of protective relays the operator will then throw off the motor switch, and when he has withdrawn the board from the saw or otherwise relieved the pinching tension, he may immediately start his motor and drive the saw.

A device so constructed, it will be seen, operates automatically and instantaneously to protect the gears and shafting of the transmission, and automatically and instantaneously resets itself for the next emergency without any attention of adjustment whatever. Owing to the peculiar function that such a device performs, there is little or no wear at all upon the respective parts, and the device once constructed and set so as to provide the absorbing action at a point well above the torque capacity of the motor but below the breaking point of the gear teeth, will last indefinitely.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:

1. A device for eliminating energy incident to a sudden stopping of the driven element of a high speed motor driven power transmission combining an electric motor; a cone element; a positive acting driving connection between said cone element and the motor shaft of said motor; a gear mounted on said cone element; disc spring means normally operative to maintain the gear in relatively tight frictional engagement with said cone element with a force greater than required to transmit the capacity torque of the motor, said cone and gear elements having complemental tapers of approximately 15° sloping in a direction opposed to the action of said disc spring means and coacting with said spring means to provide a momentary motor inertia absorbing yield in the transmission when the driven element is suddenly stopped and thereafter operative promptly to stall the motor.

2. A device for safely eliminating the energy in a high speed electric motor driven power transmission incident to an abrupt stopping of the driven element, comprising a cone element; a driving connection between said cone element and the motor shaft of the transmission; a gear frictionally mounted on said cone element and with a force sufficient to transmit two and one-half times the full torque of the motor of the transmission; disc spring means engaging said gear and normally operative to maintain the gear in driving engagement with said cone element to the stalling point of the motor; said cone element and gear having complemental tapers of approximately 15° sloping in the direction opposed to the action of said spring means and adapted to cooperate with said spring in providing a momentary motor inertia absorbing yield in the transmission upon a sudden stopping of the element and thereafter immediately effective to stall the motor.

3. In a high speed electric motor driven power transmission a device for preventing breaking of gears as a result of forces generated in the motor upon a sudden stopping of the driven element of the transmission; combining a driving and a driven member comprising a cone shaped element and a gear element, said gear element having a tapered bore adapted to fit the cone element, the incline of the side walls of the bore and cone being approximately 15°; means mounting one of said elements to be slightly shiftable axially; disc spring means for urging said gear and cone member into relatively tight frictional driving relation with a force sufficient to effect the transmitting of more than the full normal torque of the transmission and to stall the motor when opposed; and anti-friction means interposed between said spring and the said axially shiftable element to prevent sticking of the parts, said cone and spring elements cooperating to afford a momentary motor inertia absorbing yield in the drive upon a sudden stopping of the driven element and instantly effective thereafter to stall the motor.

4. In a circular saw of the gear driven type a device for dissipating the excessive energy of inertia incident to an abrupt stopping of the saw comprising a cone shaped driving member; gear mounted thereon, said gear having a cone shaped central bore adapted to fit the cone member, the incline of the surfaces of the bore and cone extending at an angle of approximately 15° to the axis; an electric motor connected positively to drive said cone member; and means comprising a cupped annular disc reacting upon the end face of the gear for urging said gear and cone member into relatively tight frictional driving relation; said cupped disc means exerting an equalized force on the gear approximately two and one-half times greater than the resulting axial counterforce thereon incident to any normal torque load transmitted through the said cone-shaped surfaces irrespective of the direction of rotation, said cone and disc elements coacting together to afford a momentary motor inertia absorbing yield, amounting to only a few degrees change in angular phase relation between said cone and its gear, in the drive upon a sudden stopping of the driven element and instantly effective to stall the motor.

5. In a high speed electric motor driven gear transmission, a device for dissipating motor energy incident to a sudden stopping of the transmission comprising a helical gear; a cone shaped driving element, said gear being spring pressed into relatively tight frictional engagement upon the driving cone element; a second gear of opposite hand helix meshing with said spring pressed gear and normally driven thereby; said first named gear having the helix angle of the teeth extending in a direction such that the force of motor inertia resulting from a sudden stopping of the driven gear reacts against said spring pressed gear and against the helix angle of the gear teeth and is absorbed in producing a change in phase amounting to only a few degrees between said cone and gear; and means operating to maintain said gear and cone in effective driving relation with a force sufficient to transmit more than the maximum rated torque of the motor at all times.

6. In a high speed electric motor driven power transmission, a device for absorbing excess energy comprising a pair of driving and driven helical gears mounted respectively on driving and driven shafts one of which is motor driven, one of said gears having a cone shaped central bore; a complementally shaped cone member fitted into said bore key means for locking said cone member to its associated shaft; means resiliently urging said cone and associated gear into relatively tight frictional driving relation with a force sufficient to transmit more than the full normal torque of the transmission; said cone mounted gear having the helix angle of the teeth extending in a direction opposed to said resilient means so that the force of motor inertia incident to a sudden stopping of the driven gear reacts through the helical teeth and against said resilient means and is absorbed in effecting a slight change in phase amounting to only a few degrees between said cone mounted gear and said cone element, said resilient means normally operating to maintain said gear and cone elements in effective driving relation with a force not less than twice the rated maximum torque of the motor.

7. In a high speed electric motor driven power transmission, a device for absorbing excessive energy comprising a pair of driving and driven helical gears mounted respectively on driving and driven shafts, means mounting one of said gears as to be slightly shiftable axially on its associated shaft; spring means resiliently urging said shiftable gear into relatively tight frictional driving relation with its associated shaft with a force greater than required to stall the motor of the transmission under any normal condition of operation; said gears having the helix angle of the teeth extending in a direction opposed to the action of the said spring means and operating to provide a momentary yield in the drive upon a sudden stopping the driven gear of the transmission, said resilient means in cooperation with the helical teeth of the gears momentarily absorbing the inertia energy of the motor and operative promptly thereafter to render the connection positive to stall the motor.

8. In a high speed electric motor driven gear transmission a device for preventing breaking of gears resulting from a sudden stopping of the driven element of the transmission comprising a helical gear spring pressed into relatively tight frictional engagement to a driving element; a positive drive connection between said element and the motor of the transmission; a second gear of opposite hand helix meshing with said spring pressed gear and normally driven thereby; said first named gear having the helix angle of the teeth extending in a direction tending to release the gear momentarily from the said driving element upon a sudden stopping of the said second gear; and means operating to maintain said gear and driving element in driving relation with a force sufficient to transmit the capacity torque of the transmission and to stall the motor.

WILLIAM FERDINAND OCENASEK.